United States Patent [19]

Liebard

[11] Patent Number: 4,674,478
[45] Date of Patent: Jun. 23, 1987

[54] SOLAR WATER HEATER FOR HEATING AND STORING WATER THROUGH DIRECT PASSAGE AND ITS MANUFACTURING PROCESS

[76] Inventor: Alain Liebard, 7, rue d'Argenteuil, 75001 Paris, France

[21] Appl. No.: 688,846

[22] Filed: Jan. 4, 1985

[30] Foreign Application Priority Data

Jan. 6, 1984 [FR] France .................. 84 00188
Dec. 17, 1984 [FR] France .................. 84 19250

[51] Int. Cl.⁴ .................................... F24J 2/24
[52] U.S. Cl. ................................. 126/443; 126/452; 126/450; 126/417
[58] Field of Search ............. 126/443, 447, 446, 431, 126/444, 900, 450, 452; 29/400 C, 400 M, 400 R, 157.3 R, 157.4

[56] References Cited

U.S. PATENT DOCUMENTS

| 1,068,650 | 7/1913 | Harrison | 126/443 X |
| 3,227,153 | 1/1966 | Godel et al. | 126/443 |
| 4,081,289 | 3/1978 | Campbell | 126/443 X |
| 4,133,298 | 1/1979 | Hayama | 126/443 |
| 4,258,699 | 3/1981 | Masel et al. | 126/444 X |
| 4,281,637 | 8/1981 | Wilson | |
| 4,355,629 | 10/1982 | Cornell | 126/437 |
| 4,416,257 | 11/1983 | Bale | 126/443 X |
| 4,520,795 | 6/1985 | Parkyn et al. | 126/443 |

FOREIGN PATENT DOCUMENTS

| 41943 | 12/1981 | European Pat. Off. |
| 3027570 | 2/1982 | Fed. Rep. of Germany |
| 2468077 | 10/1979 | France |
| 2500598 | 2/1982 | France |
| 2524619 | 4/1982 | France |
| 2528955 | 6/1982 | France |

Primary Examiner—Larry Jones
Attorney, Agent, or Firm—Pollock, VandeSande & Priddy

[57] ABSTRACT

The invention pertains to a solar water heater for heating and storing water through direct passage.

The water heater includes a tank (13) which is mounted inside an outer structure (12) inside of which is a high vacuum. Pipes acting as elastic water ducts (30, 31) guarantee the sealed water input and output which cross the outer glass structure. Recesses (26) which cooperate with spacers guarantee the immobilizing of the tank (13) inside the structure (12).

2 Claims, 18 Drawing Figures

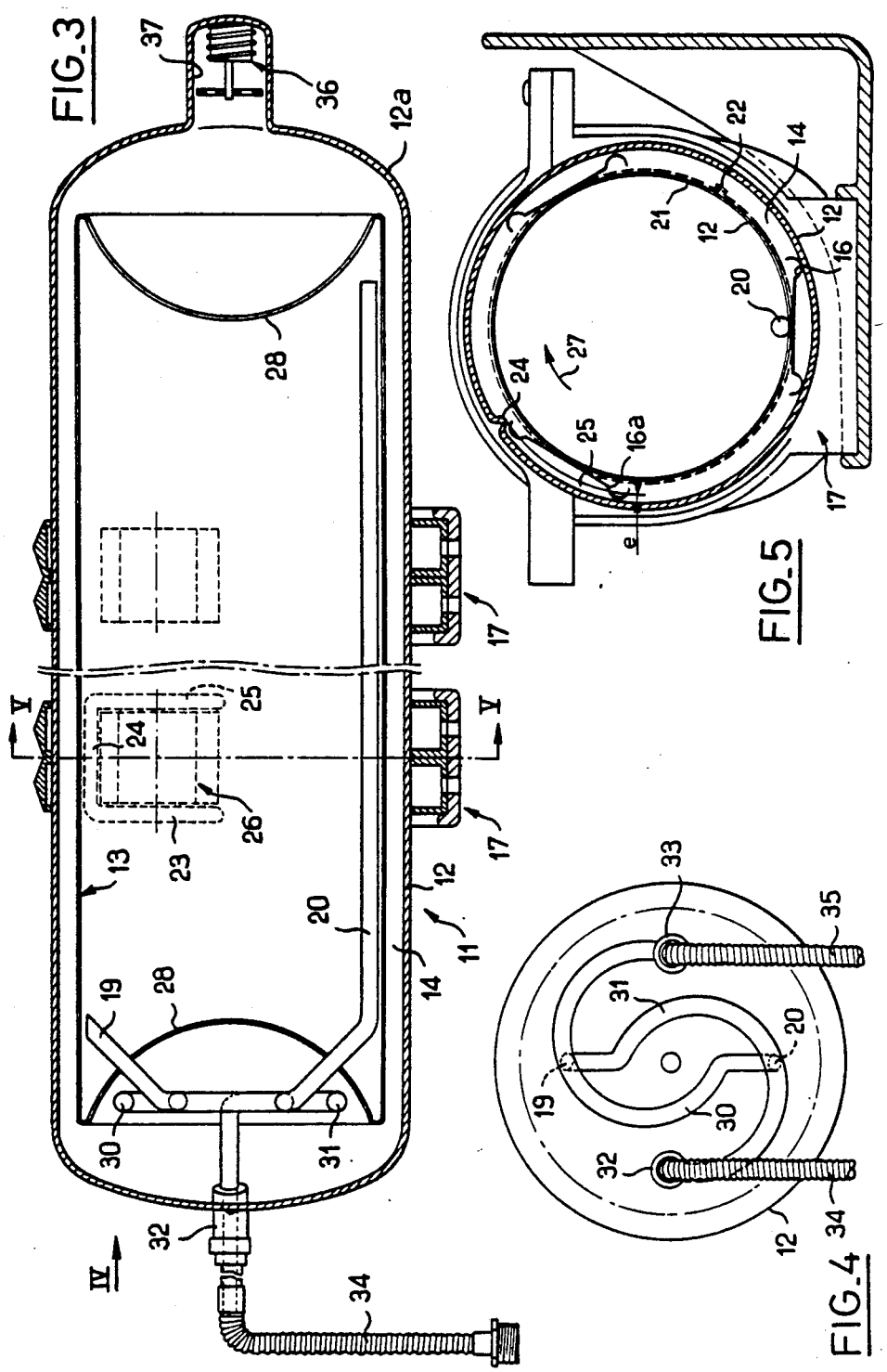

SOLAR WATER HEATER FOR HEATING AND STORING WATER THROUGH DIRECT PASSAGE AND ITS MANUFACTURING PROCESS

BACKGROUND OF THE INVENTION

This invention pertains to improvements to a solar water heater.

It involves a solar water heater which heats and stores water through direct passage that does not include a water exchanger and which acts as a compact unit that performs and which is economical.

The sought-after goal according to the invention is to construct an efficient solar water heater at a low cost, which is compact, and that does not require ancillary equipment, which is insensitive to frost, and that can be set up with excellent performance regardless of the region, whether cold, mild or tropical.

The solar water heater, which is the subject of the invention, is of the kind that includes a storage tank which is located inside the transparent structure. According to the invention, the storage tank is mounted inside a transparent structure which is completely sealed, and is resistant to atmospheric pressure. An intermediate narrow space for a vacuum is provided, between the tank and the outer structure, at least two hydraulic water input and output connections connect the storage tank to the outside of the water heater crossing in sealed fashion the outer structure, and at least two series of spacers are arranged between the tank and the structure, and are located towards the two ends of the tank which sustain the structure of said vacuum space.

This overall concept provides a water heater having very substantial benefits compared to the water heaters of the prior known art. These benefits basically come from the excellent thermal insulation of the inner tank that is housed inside a glass structure which is not very far from the outer wall of the tank and inside which structure a high vacuum exists. However, such a construction raises many technical problems that this invention enables to resolve under the best circumstances.

In particular, in conformance with this invention, hollow or protruding housings are formed inside the inner wall of the outer structure in order to accommodate at least some of the spacers. This prevents rotation in one direction and translational motion in both directions of the tank inside the glass structure, which makes it possible to work on the unit in one rotational direction during welding of caps that close the ends of the structure and also guarantees blocking a translational motion of the tank inside the structure which facilitates the transportation of the heater.

According to another characteristic of the invention, at least one bottom of the inner tank is concave, which facilitates the operations of closing the structure surrounding the tank, and also enables savings in clearance volume.

According to another characteristic of the invention, the water inlets and outlets from the tank are installed with elastic connections, which limits the expansion constraints that might be exerted on the glass structure.

The invention also refers to a method for manufacturing the water heater which includes various successive implementation stages.

The invention, its advantages and its implementation shall appear more clearly with the description that follows, which refers to the attached drawings wherein:

BRIEF DESCRIPTION OF THE FIGURES

FIG. 3 shows in detail lengthwise section, parallel to its axis, of an embodiment of the water heater, FIG. 4 is an end view taken in the direction of arrow IV of FIG. 3, FIG. 5 is a sectional view taken on line V—V of FIG. 3.

DESCRIPTION OF THE PREFERRED EMBODIMENT

Figure 1:
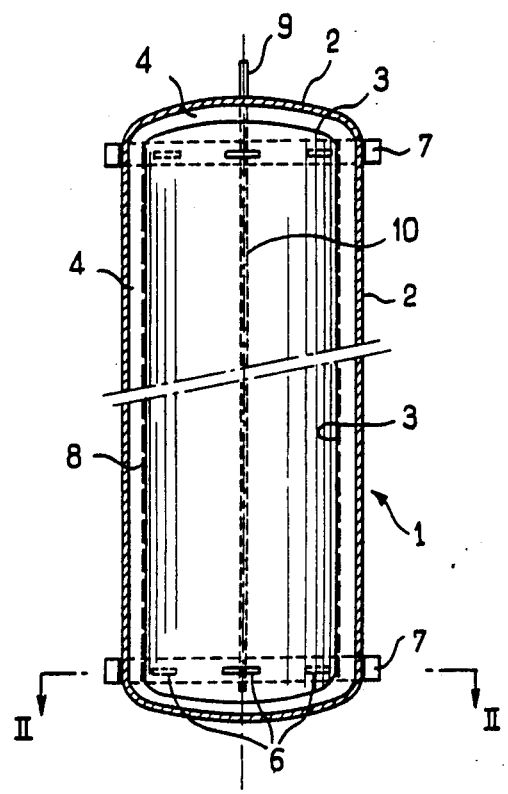
FIG. 1 shows in an elevated section and schematically a water heater constructed according to the invention.
Figure 2:
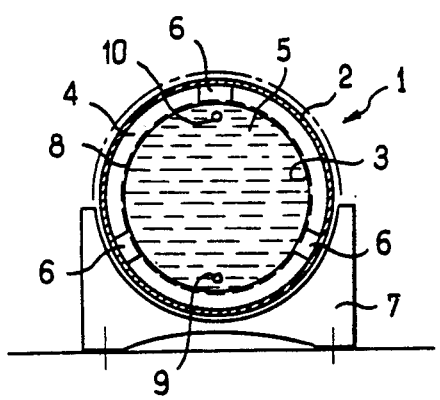
FIG. 2 is a cross section taken on line II—II of FIG. 1.
Figure 6:
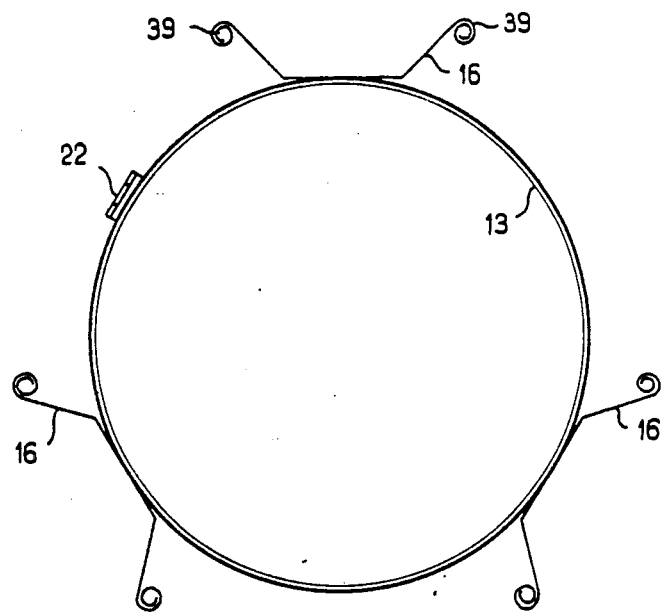
FIG. 6 shows schematically three spacers which are fastened around a tank according to a preferred embodiment prior to inserting the tank inside the outer glass structure of the water heater.
Figure 7:
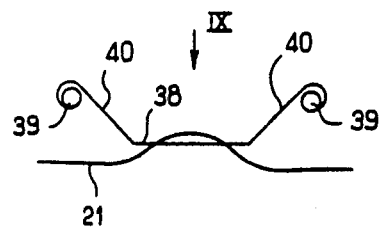
FIG. 7 shows a detail of the fastening for a spacer around the tank, FIG. 8 displays in a larger scale the detail of an end of a spacer.
Figure 9:
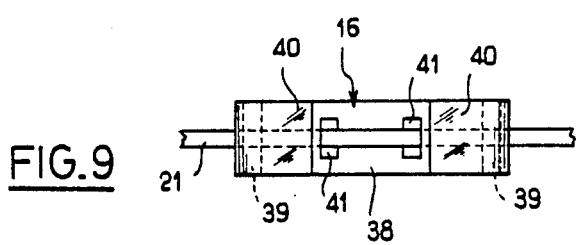
FIG. 9 is a view from above taken in the direction of arrow IX of FIG. 7, FIG. 10 displays schematically in a cross section the positioning of the tank with spacers inside the structure when the tank is not filled with water.

First of all we will refer to FIGS. 1 and 2 which depict the overall assembly of a water heater as conceived according to the invention.

The water heater which is referred to as 1 as a whole basically includes a general outer structure 2, which is transparent, sealed, resistant to atmospheric pressure, or about 1 bar, and for instance made of borosilicate glass. Inside there is a metal tank 3 which acts as a water storage tank indicated as 5 (FIG. 2) and is therefore resistant to the latter's corrosion and to pressure from the water network. Between the outer structure 2 and the storage tank 3 there is an intermediate space 4 which surrounds the entire tank 3. The thickness of this space is preferably constant and small, for instance about 1 or several centimeters. A high vacuum, for instance of about $10^{-5}$ bars is provided in this space.

In order to keep the thickness of the vacuum spacing 4 constant, spacers 6, for instance made of metal, and properly fastened to the tank 3 are arranged towards the two ends of the tank.

The overall water heater 1 can rest on the ground, on a roof or on any kind of support. For instance it may be placed there parallel to its lengthwise axis with two parts 7 that conform to the outer surface of the structure 2 on its lower section, structure 2 being hooped at its upper section for a better hold. The parts 7 are advantageously positioned more or less in the same vertical plane as the spacers 6 so as to assume the storage loads of the tank 3 without any special effort for the structure, the tank 3 acting as a beam which bears the assembly.

The storage tank 3 is covered with a surface which absorbs and/or selects sun rays along its entire outer surface. This coating can be achieved by paint, submersion inside an electrolytic bath or the gluing of a coating made of a thin adhesive sheet.

Two hydraulic connections are provided, i.e. a cold water input at 9 and a hot water output at 10 which extend inside the storage tank 3 respectively to the two most extreme diagonal points, in order to avoid mixing hot water with cold water and to extract the hottest water from the upper section of the tank 3.

The water heater 1 can be positioned as desired, for example horizontally on a north-south or east-west axis, or obliquely on a roofing for instance, by making sure in the latter case that the hot water output extends to the highest section of the tank.

As an example a water heater in conformance with the invention can be constructed from a structure 2 made of borosilicate glass, with a round section that has an outer diameter of 200 mm, which is 5 mm thick and is 3.10 m long overall. The storage tank 3 is made of stainless steel or coated black steel, also with a round section that has an outer diameter of 170 mm, which is 2.5 mm thick and it is 3 m long. The intermediate spacing 4 is more or less constant including the ends, and it is 10 mm thick. The coating 8 can be a selective self-adhesive film. With this construction, the water heater might have a storage volume of 66 liters for a sun ray absorption surface of 0.50 m$^2$ as anticipated and an overall absorption surface of 1.2 m$^2$ which is computed on the basis of three quarters of the total area of the coating 8 which is 1.6 m$^2$.

Still according to the invention, storage capabilities and therefore greater daily hot water production can be achieved by coupling several units 1 in conformance with the previous description. For instance 132 liter or 198 liter capacity water heaters can be executed by coupling two or three units 1 on a common underframe, the overall hydraulic connections being constructed prior to manufacturing.

As a selective coating, we use a coating with a high absorption $\alpha$ coefficient and a low emission coefficient $\epsilon$, for instance $\alpha$ may have a value between 0.95 and 0.98 and $\epsilon$ may have a value between 0.12 and 0.25.

The water which is stored inside the main tank is direct in contact with the hot wall of the tank when the latter and is then strongly heated. Performance coefficients are excellent since the outer sealed transparent structure guarantees the greenhouse effect, the intermediate space 8 which is air free prevents thermal exchange through convection or conduction, and the selective coating of the storage tank increases absorption and reduces losses through radiation.

By referring to FIGS. 3 through 5 we will now describe a preferred assembly mode.

In these drawings, the elements which are similar to the embodiments shown in FIGS. 1 and 2 are indicated by numerals increased by 10 over those in FIGS. 1 and 2 and therefore we will not describe anew all those elements.

In relation to the schematic embodiment of FIGS. 1 and 2, we will basically note the following specific characteristics of the embodiments of FIGS. 3 through 5.

Spacers 16 are spring blades which are fastened around the tank 3 with a flexible band 21 which is properly tightened at 22 according to conventional closing methods for packages and crates. The fastening mode for the spacers will appear more clear with the description of FIGS. 6 through 9. Thus, we avoid welding and corrosion problems on the tank 3 from the spacers 16.

Two sets of three spacers 16 are provided towards the opposite ends of the water heater. In the embodiment which is illustrated wherein the tank is about 3 m long, the spacers are fastened at about 250 mm from each end.

Moreover, as can be seen from FIGS. 3 and 5, one of the spacers identified at 16a is positioned inside the glass structure 2 in a general U-shaped housing of which the three branches 23, 24, 25 are formed through local distortion towards the inside of the wall of the structure 2 on a small thickness e, for instance of about 3 or 4 mm. Thus, the spacer is retained inside the housing 26 which is formed by that U with three branches 23, 24, 25, thereby immobilizing the tank from movement parallel to its axis inside the structure 12. This also makes it possible to block the rotation of the tank 13 by preventing the latter from turning in the direction of arrow 27 in relation to the structure 12, for reasons which will be given later.

The ends 28, 29 of the tank 13 display their concaveness outwardly, which displays advantages in terms of overall clearance of the water heater and of manufacturing, as will be shown later.

In one of the hollow ends 28, connection ducts 30, 31 are housed respectively to the cold water input 20 and the hot water output 19, and the ducts 30, 31 are formed in "a pig's tail" by establishing a flexible output junction with the sealed fittings 32, 33 of the structure 12. Indeed, it is necessary to provide for possible expansion of the tank 13 with its connection ducts in relation to the structure 12 while subjecting the latter to reduced constraints only.

At 34, 35, are depicted flexible union stems for connecting the water heater to cold water intake and hot water outlet channels from the facility to be equipped, these flexible stems being designed to prevent a rupture of the glass section of the tank that is welded to the water input and output when the tank is connected to the facility.

At the opposing end of the structure 12 is a getter which is identified at 36 as a whole and housed inside a protuberance 37 from the corresponding bottom 12a of the structure 12 of which the implementation and the purpose will be described in more detail later on.

Now we will refer to FIGS. 6 through 9 to show in more detail the function of the spacers 16.

Preferably, towards each end of the tank are arranged three spacers 16 which are made of a U-shaped spring blade, that includes a bottom 38 joined by two branches 40 with two wrapped stands 39. The fastening of each spacer is performed with a flexible band 21 which goes inside two scallopings 41 formed in the bottom 38, and the flexible band 21 is tightened with a tightening device 22 of any known appropriate kind. Thus, the three spacer stands 16 can be appropriately distributed at 120° one from the other around the tank 13 and strongly subjected to it without having to resort to any operation such as welding which can alter the wall of the tank.

Figure 8:

The detail of FIG. 8 shows that preferably the spring blade is wrapped around itself for at least one complete turn. This allows the wrapped stands 39 to display sufficient resistance in order to prevent their being crushed under the weight of the water-filled tank.

Figure 10:
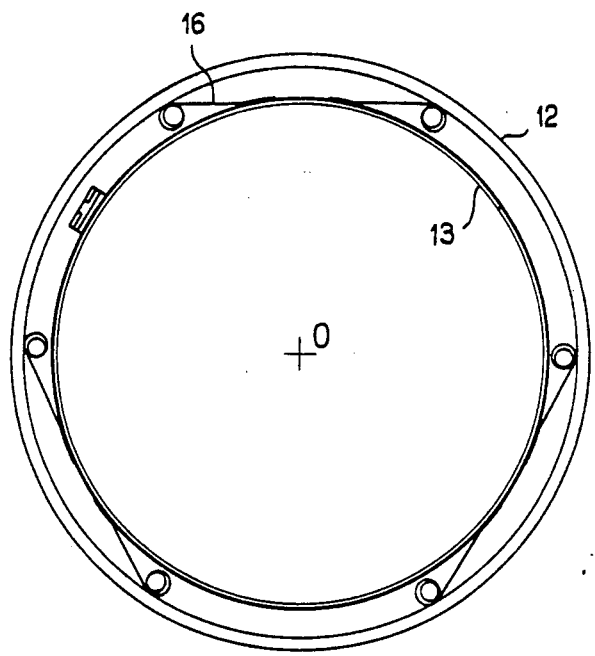
Figure 11:
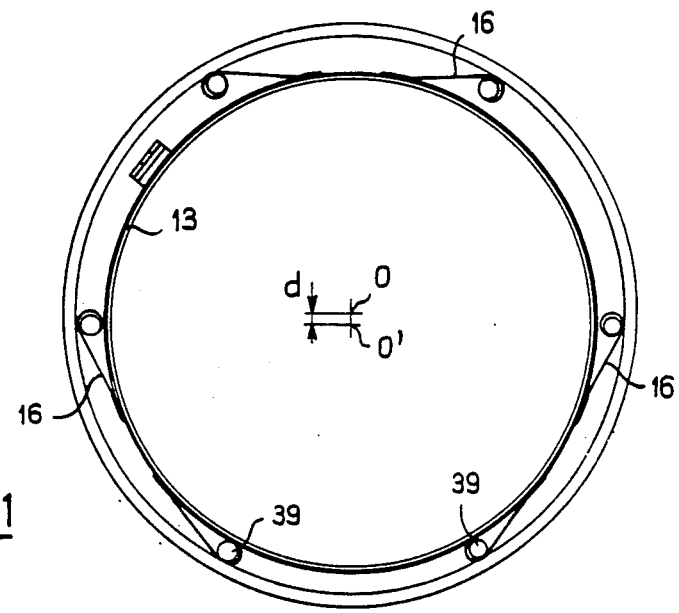
FIG. 11 is a view that is similar to that of FIG. 10, except that the tank is filled with water, FIG. 12 displays in a lengthwise section and schematically how the arrangement of the hot water outlet and the cold water inlet inside the tank, FIG. 13 displays in a smaller scale and schematically a housing provided for a spacer inside the wall of the structure.

Thus, by referring to FIGS. 10 and 11, we note the positions which were respectively adopted by the tank 13, mounted inside the structure 12 and kept separate from it by the spacers 16, when the tank does not hold any water (FIG. 10) or when the tank is filled with water (FIG. 11). In that instance the tank becomes somewhat off-center (d) by leaning on, and distorting, without crushing them, the two stands 39 of the two spacers 16 which are mounted at the lower section of the tank.

Figure 12:
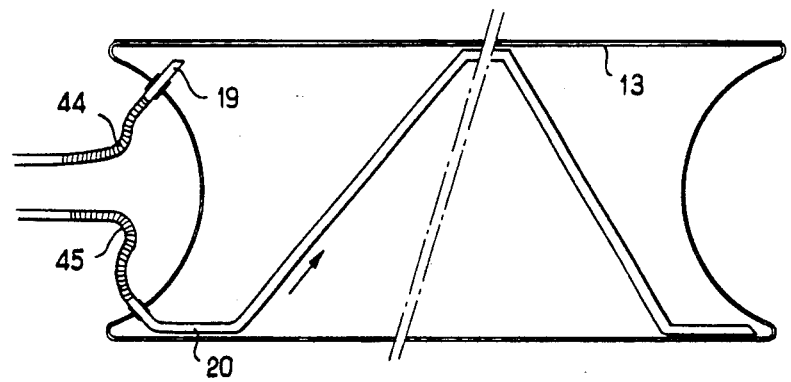

In FIG. 12, is schematically displayed arrangement by the hot water output 19 and the cold water input 20 inside the tank 12.

In view of the significant length of the tank in relation to its diameter, a sinuous path is provided in an advantageous way to the cold water duct 20, for instance propeller-like that follows the inner wall of the tank, against which wall it remains wedged. The connections which must go through the glass structure in a sealed fashion (not depicted) can be formed, as illustrated, with flexible ducts 44, 45, in order to allow for differential expansions between the tank 13 and the structure 12.

Figure 13:
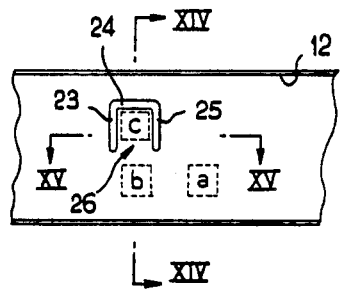
Figure 14:
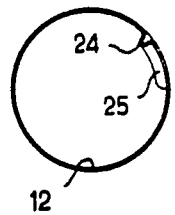
FIGS. 14 and 15 are sectional views taken respectively along lines XIV—XIV and XV—XV of FIG. 13, FIG. 16 displays schematically a method of inserting the tank inside its glass structure, FIG. 17 displays sectionally the installing detail of a getter at one end of the tank, FIG. 18 displays in greater detail and at a larger scale how the getter can be constructed and set up.
Figure 15:
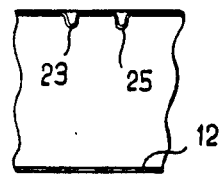

FIGS. 13 through 15 depict the housing 26 which is formed inside the wall of the glass structure 12 in order to accommodate and wedge a notch from a spacer 16. The insertion of the notch inside the spacer is performed by bringing the notch at the position referred to as a close to the input of housing 26, by pushing it to the height of the housing input at b, and by making the tank 13 (to which the notch is attached) turns inside the structure 12 until the notch becomes blocked at c at the bottom of the housing 26.

Figure 16:
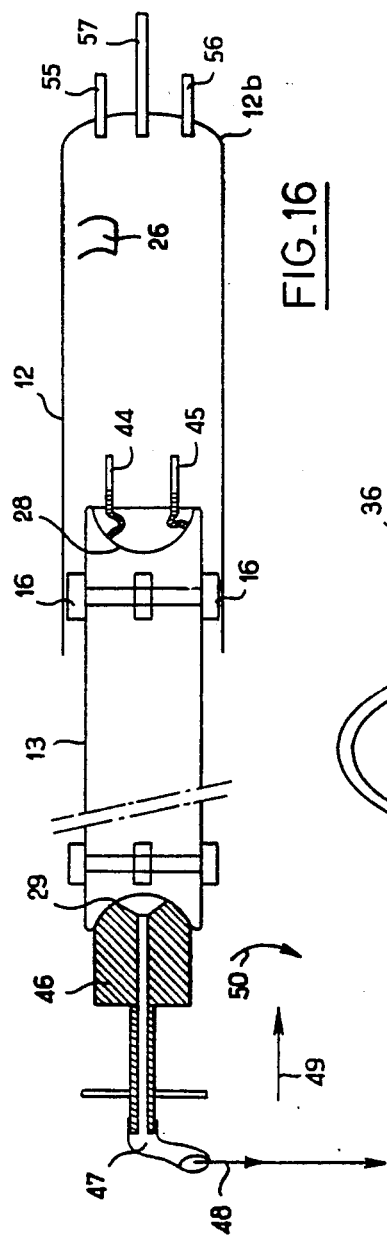

The tank set-up 13 inside the structure 12 will now be detailed by referring to FIG. 16.

First of all it will be assumed that the structure 12 is already constructed in part with a bottom 12b that is already welded. The overall successive operations to be implemented for complete manufacturing of a water heater will be described below.

The tank 13, which is outfitted with its hot water and cold water outputs, such as 44, 45 for instance, is inserted inside the structure 12 by being held at its bottom 29 with a suction cup 46, that is connected through a duct 47 to a vacuum pump, as shown by arrow 48.

The notches 16 of the spacers are temporarily held against the wall of the tank 13 with a flexible binding (not depicted) until the notches are engaged inside the opening of the structure 12. Then, the outer flexible binding is withdrawn and the unit is moved, as shown by arrow 49, until the second set of notches 16 is also engaged inside the opening. Then we continue to push the entire tank 13 until the notches 16 reach the height of the housing 26. At that point, the tank 13 is turned in the direction of arrow 50 in order to allow the corresponding spacer notch to penetrate inside the housing 26, as it was explained in relation to FIGS. 13 through 15.

Figure 17:
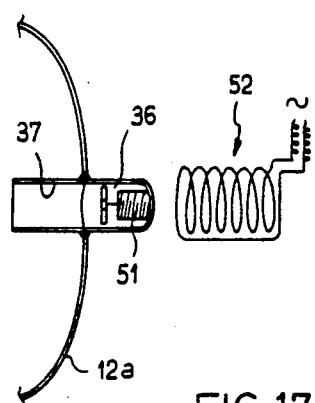
Figure 18:
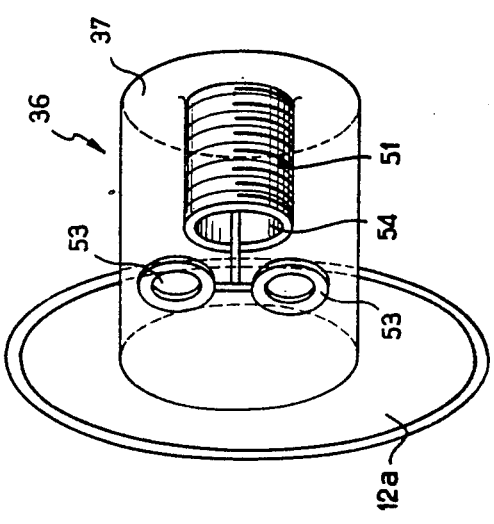

Referring to FIGS. 17 and 18 the use of the is explained.

As it well known in the advanced vacuum method, we can perfect the vacuum inside a structure by vaporizing specific elements in it when a fairly significant vacuum has already been achieved. For instance, barium can thus be vaporized inside a structure wherein a relative vacuum of about $10^{-4}$ bar exists, so as to raise the vacuum to a higher value, for instance, about $10^{-6}$ bar. Furthermore, "flashing" barium on the neighboring glass walls of the structure produces a silvery reflecting color which provides a vacuum test. Indeed, in the event of a leak or of air insertion inside the structure, the oxygen-starved barium oxidizes and becomes whitish.

Vaporizing barium can take place with an electric wrapping 51 which will make it possible to heat the substance to be vaporized from the getter 36, when an induction coil 52 (FIG. 17) is applied externally around the wrapping 51. The practical assembly can be performed as shown in FIG. 18 by providing for the feed wrapping 51 of a heating resistor that makes it possible to heat resistors 53 on which the barium was previously deposited, the wrapping 51 being formed on a small glass cylinder 54, which is itself welded to the bottom of the housing 37 that is also made of glass, itself welded to the cap 12a.

Now we will describe in relation to the various figures the various successive operation which must be achieved in order to manufacture the water heater.

We separately construct glass cylinders which comprise the main section of the structure 12, with a possible outer diameter of 200 mm and a wall thickness of 5 mm, so as to be able to resist crushing from the atmospheric pressure when the structure is placed under vacuum.

We also separately construct end caps such as 12a, 12b which will have to cover and close the structure 12. Cap 12b will have to include (FIG. 16) two glass tubes 55, 56 in which the tank input and output waterpipes 44, 45 will be engaged. This cap can include also a third glass tube 57 through which a vacuum will be created inside the structure.

We separately construct the tank 13 of which the outer diameter is slightly less the inner diameter of the structure. For instance, the outer diameter of the tank can equal about 170 mm. It is constructed, preferably of steel and it must be prone to resistance against a water calibration pressure (usually 9 bars) increased by one bar which corresponds to the vacuum achieved inside the structure 12.

The tank 13 is provides with its ends and with its water input and output ducts together with flexible connections. Two pipes 44, 45 protrude at one end and exit through tubes 55, 56 from the cap 12b.

The structure 12 also includes the housing 26, which can be made hollow or in relief on its inner wall, for blocking at least one spacer 16 or one of its stands 39.

We weld the cap 12b to tube 12.

The tank 13 is fitted with its series of spacers 16 which are kept separate with a temporary flexible band.

We insert through an axial translation motion the tank 13 inside the structure 12 by releasing the flexible band when the spacers entered the cylinder, which makes it possible to properly engage the tank 13 with its spacers 16 inside the structure 12 without scratching it (which might embrittle the glass).

When the tank 13 is properly engaged inside the structure 12, we make the tank 13 turn slightly on itself, as shown in FIG. 16 inside the structure 12 in order to block the corresponding spacer in the housing 26. Simultaneously we made sure that the flexible pipes 44, 45 come out of the tubes 55, 56 from cap 12b.

Since the tank 13 is properly positioned and wedged inside the structure 12 we can withdraw the suction cup 46 which was used to insert it, and we can install the other cap 12a which we will be able to weld to the contiguous wall 12 of the structure by making the entire water heater turn once to achieve a proper welding and homogeneous heating of the cap on the structure 12. The concave bottoms of the tank will make it possible to prevent overheating phenomena that might especially hamper the specific absorbing coating of the tank. Moreover, since the getter 36 is protected in its housing 37, it is no longer subjected to sudden overheating during the closing operation for the structure through welding of the cap 12a.

When those operations are over, we begin to place the structure under vacuum through the tube 57 which is connected to an appropriate vacuum source. Simultaneously, we perform the welding of tubes 55 and 56 around cold water and hot water output pipes 44, 45. This welding is performed by simple heating of tubes 55, 56 which, as a result of the reduced pressure achieved inside the structure, press against the tubes 44, 45. We sustain a vacuum, of about $10^{-4}$ bar for instance while heating the unit, at around 300° C. for example in an oven for 3 to 4 hours, so as to prevent any degassing in time.

Then, we seal the vacuum tube 57 and we vaporize-flash the getter to increase the vacuum up to $10^{-6}$ bar. The maintenance of the silvery vaporized barium color on the adjacent walls of the structure is a guarantee of sustained vacuum.

Many implementation variations can be added to the construction, assembly and manufacturing modes which were described. In particular, a number of operations can be reversed and the various envisioned and described solutions can be combined.

For instance, with respect to the glass cap welding to the two ends of the structures, we can use heating ramps in order to avoid having to make the entire structure turn on itself as well as the storage tank.

Generally speaking, the use of synthetic and plastic materials will be proscribed inside the structure under vacuum, because those materials are degassed in time and they might deplete the performance of the apparatus. The materials in use will basically be metallic such as steel, copper, etc. . . .

Furthermore, the external absorbing coating of the tank will have to be able to withstand the steps of heating of the assembly process for the unit and drying at the end of the degassing operation.

With respect to the outer stands 17, we will be able to use flexible plastic materials such as PVC which will reduce constraints with glass and they will also ensure a drop in that area of the thermal bridge that was formed by the presence of spacers, of which the conductivity is very small.

In view of its conception, the tank can be placed in any direction. If vertical use is anticipated, we plan to add advantageously, at least on the side of the tank which will be placed on the bottom, a buttressing glass wool mattress able to support the tank inside the structure by assuming the load on the lower cap basically which is properly accommodated in a suitable cradle.

What is claimed is:

1. A manufacturing method for a solar water heater comprising the following steps:
   constructing a cylinder tube section to be finally assembled with two end caps;
   forming recesses in an inner wall of the cylinder tube section adapted to receive spacers,
   inserting a cylindrical tank in the tube, the tank having an outer diameter smaller than the inner diameter of said tube section by 1-3 centimeters, the tank and tube section being separated by the spacers;
   fitting said tank with flexible water inlet and outlet conduits, said conduits extending at a predetermined distance within said tank;
   providing an end cap with two conduit tubes having an inner diameter slightly greater than said two conduit ends for receiving said conduits;
   connecting said cap to one end of said cylinder tube section;
   tightening the spacers with a temporary flexible band;
   inserting the tank inside the cylinder tube with an axial translation motion and releasing the flexible band after the spacers have entered the cylinder;
   turning the tank inside the tube section to bring some of the spacers in position within said recesses in the inner wall of the cylinder;
   connecting the second end cap on said cylinder;
   creating a vacuum in the space between the tank and the tube section with an evacuation tube that passes through one of the caps;
   sealably closing said two conduit tubes around said conduit ends; and
   sealing the evacuation tube of said space.

2. A method according to claim 1, wherein the vacuum is achieved by vaporizing a getter inside the structure.

* * * * *